(12) United States Patent  
Wang

(10) Patent No.: US 6,665,487 B2
(45) Date of Patent: Dec. 16, 2003

(54) PRECISION ALIGNMENT FEATURE USING A ROD WITH CONTROLLED DIAMETER IN A SILICON V-GROOVE ARRAY

(75) Inventor: Xiaomei Wang, Winchester, MA (US)

(73) Assignee: Axsun Technologies, Inc., Billerica, MA (US)

(*) Notice: Subject to any disclaimer, the term of this patent is extended or adjusted under 35 U.S.C. 154(b) by 201 days.

(21) Appl. No.: 09/864,659

(22) Filed: May 24, 2001

(65) Prior Publication Data

US 2002/0176688 A1 Nov. 28, 2002

(51) Int. Cl.[7] .................................................. G02B 6/00
(52) U.S. Cl. ......................... 385/147; 385/65; 385/83; 385/90; 385/134
(58) Field of Search ........................... 385/147, 59, 60, 385/83, 78, 65, 135, 136, 137, 90, 134

(56) References Cited

U.S. PATENT DOCUMENTS

| 5,483,611 | A | * | 1/1996 | Basavanhally | 385/78 |
| 5,519,798 | A | * | 5/1996 | Shahid et al. | 385/65 |
| 5,613,024 | A | * | 3/1997 | Shahid | 385/52 |
| 6,234,687 | B1 | * | 5/2001 | Hall et al. | 385/88 |
| 6,474,878 | B1 | * | 11/2002 | Demangone | 385/78 |

FOREIGN PATENT DOCUMENTS

| EP | 1033595 | 6/2000 | G02B/6/38 |
| WO | WO00/65396 | 11/2000 | G02B/6/42 |

OTHER PUBLICATIONS

Multiple Fiber Interconnect Using Silicon V–Grooves, P.C. Chang, S. Sriram, A.C. Wey, SPIE vol. 836 Optoelectronic Materials, Devices, Packaging, and Interconnects, 1987, pp. 311–317.

Optical Fiber V–groove Transversal Filter, S.A. Newton, K.P. Jackson, and H.J. Shaw, 1983 American Institute of Physics, p. 149.

Self–Alignment Technique for Fiber Attachment to Guided Wave Devices, Edmond J. Murphy and Trudie C. Rice, IEEE Journal of Quantum Electronices, vol. QE–22, No. 6, Jun. 1986, pp. 928–932.

* cited by examiner

*Primary Examiner*—Hemang Sanghavi
(74) *Attorney, Agent, or Firm*—Mills & Onello, LLP

(57) ABSTRACT

An bench assembly alignment apparatus and method provides for precision alignment of the assembly with an alignment feature on a substrate. The bench assembly may comprise, for example, a fiber array to be mounted to, and aligned with, an opto-electronic device within a device package. Passive alignment of the bench position and orientation is achieved in a manner that affords improved device yield and increased precision in an economical process that eliminates the need to fabricate an additional alignment surface on the side wall of the bench.

12 Claims, 5 Drawing Sheets

PRECISION ALIGNMENT FEATURE USING A ROD WITH CONTROLLED DIAMETER IN A SILICON V-GROOVE ARRAY

BACKGROUND OF THE INVENTION

In contemporary optical systems, an optical fiber interfaces with a discrete element such as an opto-electronic device. The opto-electronic device typically includes a hermetic package having conductive leads for electronic communication with devices external to the package.

During manufacture, single or multiple fiber optic pigtails are typically inserted through ferrules provided in side walls of the package. The end face of each pigtail is then positioned and bonded to a package substrate installed within the package. The body of each pigtail is bonded to the corresponding ferrule to facilitate the hermetic seal of the package.

Higher integration typically requires an increased number of pigtails to be introduced at the package perimeter. Alignment tolerances for ubiquitous single-mode fiber are tight, however the end faces of the fibers must be precisely aligned with internal opto-electronic components, for example, to micrometers.

With reference to the front and top views of FIG. 1A and FIG. 1B respectively, in order to manage fibers in a device, the fibers are commonly arranged into an array on a fiber bench 18. The fiber bench 18 is typically fabricated from silicon and includes an upper frame portion 20A and a lower frame portion 20B. A number of opposed V-grooves 24A, 24B are formed in the upper and lower frame portions 20A, 20B. The V-grooves can be fabricated with a high degree of precision both in terms of position and angular orientation, since photolithographic processes are employed.

Fibers 22A, 22B, 22C are inserted and bonded within the V-grooves 24A, 24B, and the fiber bench 18 is prepared for mounting on a package submount or substrate 16. To effect positioning and alignment of the fiber bench 18 on the package substrate 16, alignment features 26 are provided on the package substrate 10. The alignment features 26 include a registration surface 27 designed to abut a corresponding registration surface 28 on the fiber bench 18.

As explained above, the V-grooves can be formed to within precise tolerances with regard to position and angular orientation. However, formation of the registration surface 28 requires a die saw, or cleaving, operation to be performed. Such an operation is relatively imprecise, both in lateral position, i.e., along the x-axis, and in vertical and horizontal angular orientations. For example, if the cleave is taken to the left or right of the intended target position, then the end faces of the array will be misaligned by that same amount. Similarly, if the cleave is taken at an angle other than that which is intended, then angular misalignment of the array will occur. These variables, in turn, lead to low device yield.

SUMMARY OF THE INVENTION

The present invention is directed to an apparatus and method that addresses the limitations of the conventional approach described above. In particular, the present invention is directed to an alignment apparatus and method for positioning and aligning a microbench on a substrate having a registration feature in a manner that eliminates the need for precision die sawing or cleaving. By using a rod of known diameter placed in a partial V-groove, the rod itself can be employed as the registration surface for the bench, providing consistent and accurate alignment results.

According to one aspect, the present invention is directed to a bench registration system for registering a bench with an alignment feature on a substrate. The bench includes an outer wall and a registration groove. A cylindrical rod is mounted in the registration groove such that a portion of the cylindrical rod extends beyond the outer wall of the bench to engage the alignment feature.

In a preferred embodiment, the registration groove comprises a V-groove etched in a silicon-based material, and the cylindrical rod contacts the V-groove at an inner contact point and an outer contact point. The outer wall is positioned at a lateral position between the outer contact point and the outermost registration surface of the cylindrical rod portion.

The bench is preferably sawed or cleaved along the registration groove at a lateral position along the lateral axis between the future location of the outer contact point and the outermost registration surface.

The bench preferably includes an upper frame and a lower frame, wherein the upper and lower frames each include opposed upper and lower registration grooves for housing the rod. The lateral axis of the bench and the longitudinal axis of the registration groove may be perpendicular, or may lie at an acute angle with respect to each other.

In another aspect, the present invention is directed to a method for registering a known position on a bench with an alignment feature. A registration groove is formed in the bench. A cylindrical rod is mounted in the registration groove, a portion of the cylindrical rod extending beyond an outer wall of the bench such that the cylindrical rod engages the alignment feature.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The present invention provides for precision alignment of a bench assembly with an alignment feature on a package substrate. The bench assembly may comprise, for example, a fiber array to be mounted to, and aligned with, a discrete element such as an opto-electronic device or waveguide within a device package. Passive alignment of the bench position and orientation is achieved in a manner that affords higher device yield and increased precision. This results in an economical process that eliminates the need to fabricate an additional precision alignment surface on the side wall of the bench.

Figure 1A:
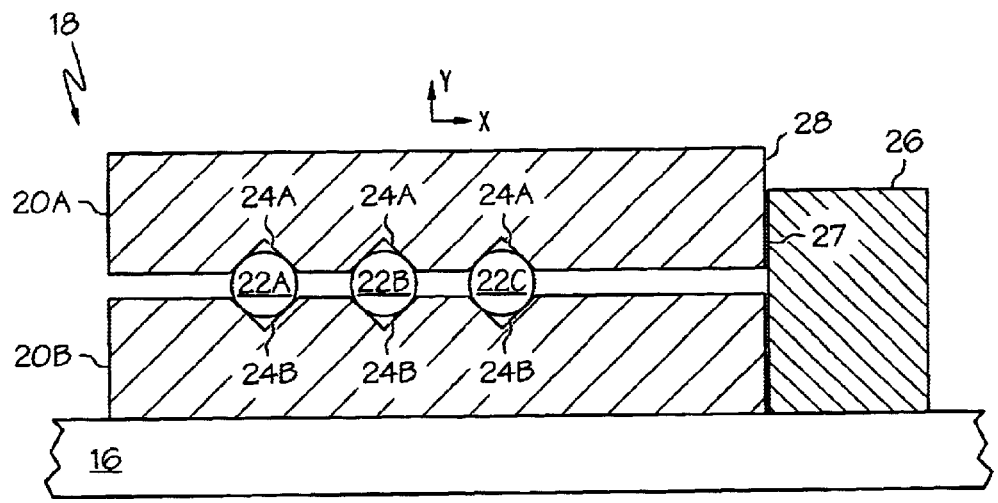
FIGS. 1A and 1B are front and top views respectively of a fiber array employing a conventional alignment configuration.
Figure 1B:
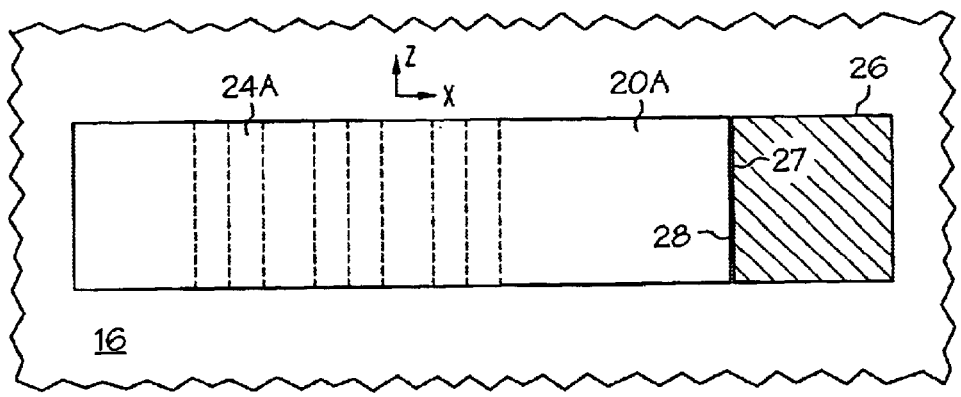
Figure 2A:
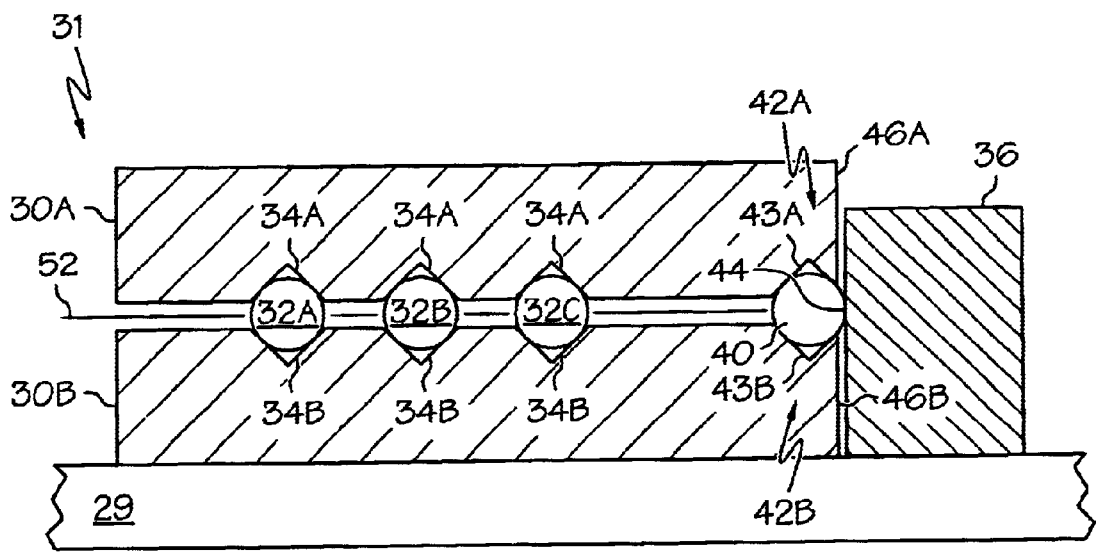
FIGS. 2A and 2B are front and top views respectively of a fiber array employing an alignment configuration in accordance with the present invention.
Figure 2B:
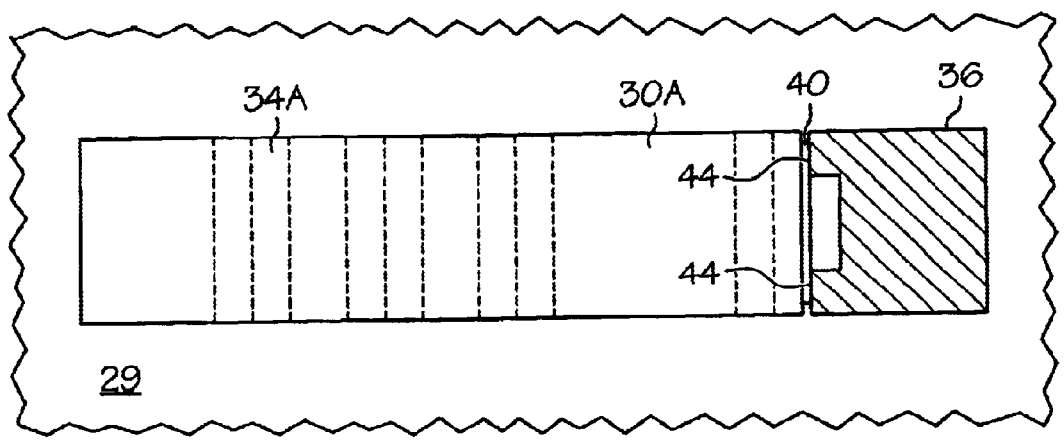

FIGS. 2A and 2B are front and top views respectively of a bench alignment feature configured in accordance with the present invention. In this example, the bench 31 comprises a fiber array. The various configurations and methods of the present invention are equally applicable to the alignment of other types of benches.

In this example, the bench 31 in the form of a fiber array comprises an upper frame 30A and a lower frame 30B, each of the frames having opposed V-grooves 34A, 34B for seating fiber optic ends 32A–32C therein. Since photolithographic processes are used for their formation, the V-grooves 24A, 24B can be generated to within precise tolerances, both in terms of lateral position and in terms of angular orientation. The present invention takes advantage of this by providing additional opposed V-grooves 42A, 42B along an outer edge of the bench 31 that serve as reference V-grooves. The reference V-grooves 42A, 42B can be formed in the same process as the fiber V-grooves 34A, 34B, and therefore, they can be positioned and oriented with a high degree of accuracy.

A cylindrical rod or reference element 40 is positioned in the reference V-grooves 42A, 42B such that a portion of the body of the rod typically extends beyond one or both of the side surfaces 46A, 46B of the upper and lower frame portions 30A, 30B of the bench 31. The reference rod 40 is preferably of a known diameter, such that when seated in the reference V-grooves 42A, 42B of known geometry, the outermost portion 42 of the rod body is positioned a known distance from a known position on the reference V-grooves 42A, 42B, for example the corners 43A, 43B. The known positions 43A, 43B are, in turn, a known distance from the other features of the components on the bench requiring alignment, for example fiber optic ends 32A–32C located in V-grooves 34A, 34B. In this manner, the body of the rod 40 operates as a registration surface 44 for registering and aligning the bench 31 with respect to an abutting alignment feature 36 on the substrate 29. The registration surface 44 of the bench is therefore determined by the position and orientation of the reference V-grooves 42A, 42B and the diameter of the reference rod 40, parameters that can be controlled to within precise tolerance levels.

Figure 3:
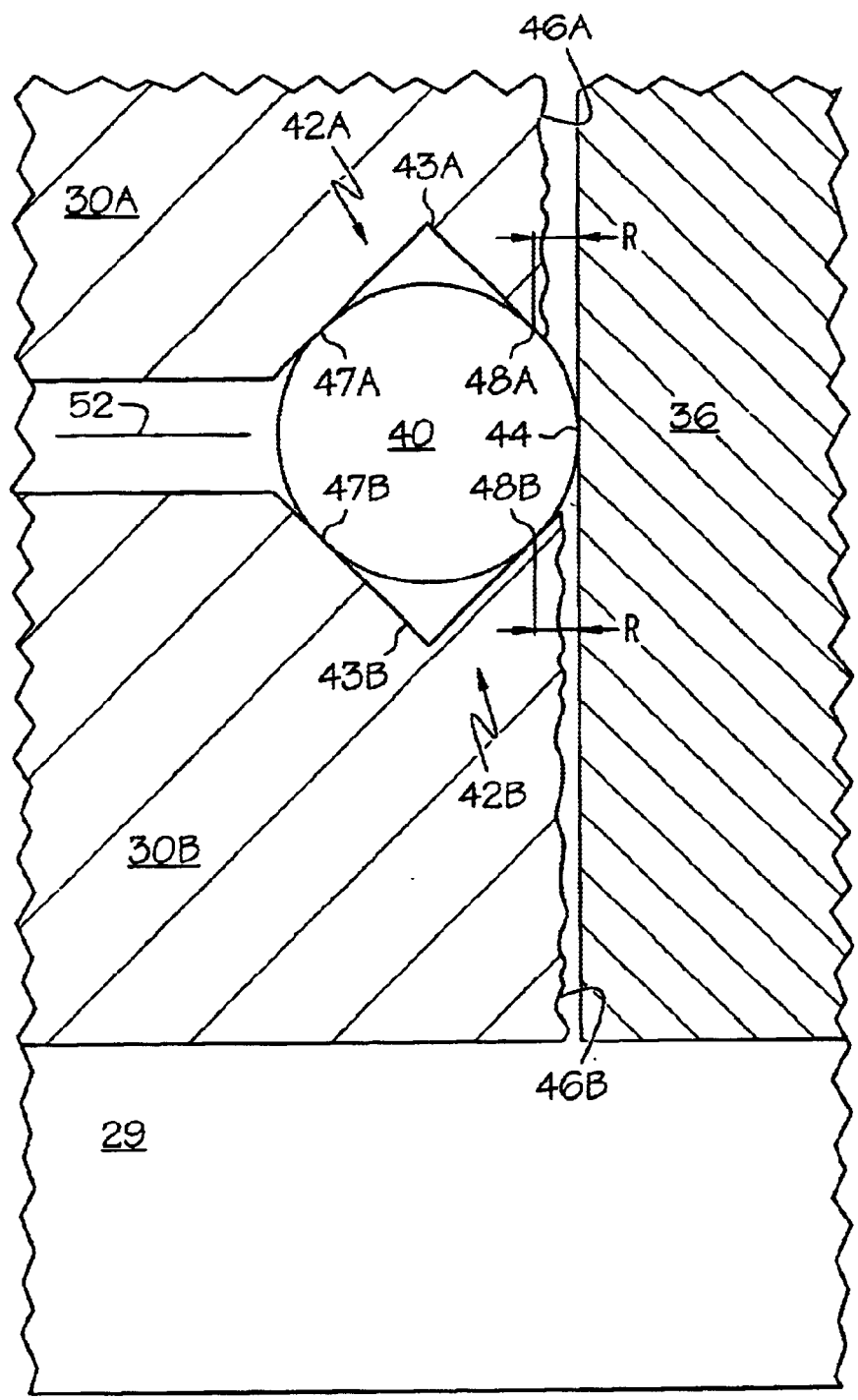
FIG. 3 is a close-up front view of an alignment configuration, illustrating expanded tolerance in the horizontal position of the bench cleave, in accordance with the present invention.

FIG. 3 is a close-up front view of an embodiment of the bench alignment configuration of the present invention. In this view, it can be seen that the side surfaces 46A, 46B of the upper and lower frame portions 30A, 30B respectively, are cleaved and/or die sawed such that the body of the rod 40 extends beyond the side surfaces 46A, 46B. Assuming that the geometry, position and orientation of the reference V-grooves 42A, 42B are known, and assuming that the diameter of the rod 40 is known, then it follows that the positions of inner contact points 47A, 47B and outer contact points 48A, 48B are also known, as is the position of the registration surface 44 of the rod.

A noteworthy advantage of the present invention lies in the fact that since the registration surface is determined by the rod 40, the cleave positions, or positions of the die saw kerfs, for the upper and lower frames 30A, 30B can be different, and can lie at any position (indicated by region of variation R in FIG. 3) along the lateral axis of the bench 52 between the respective upper and lower outer contact points 48A, 48B and the registration surface 44 of the rod 40. Therefore, the relatively inaccurate cleaving operation is effectively removed from the alignment procedure, as long as the horizontal position of the cleave does not vary beyond the outermost registration surface 44 of the rod 40 on one extreme, and beyond the outer contact points 48A, 48B on the other. Moreover, even greater variation can be tolerated in an implementation in which the alignment feature 36 comprises a tongue that extends horizontally between the frame portions 30A, 30B to engage the rod 40.

Figure 4:
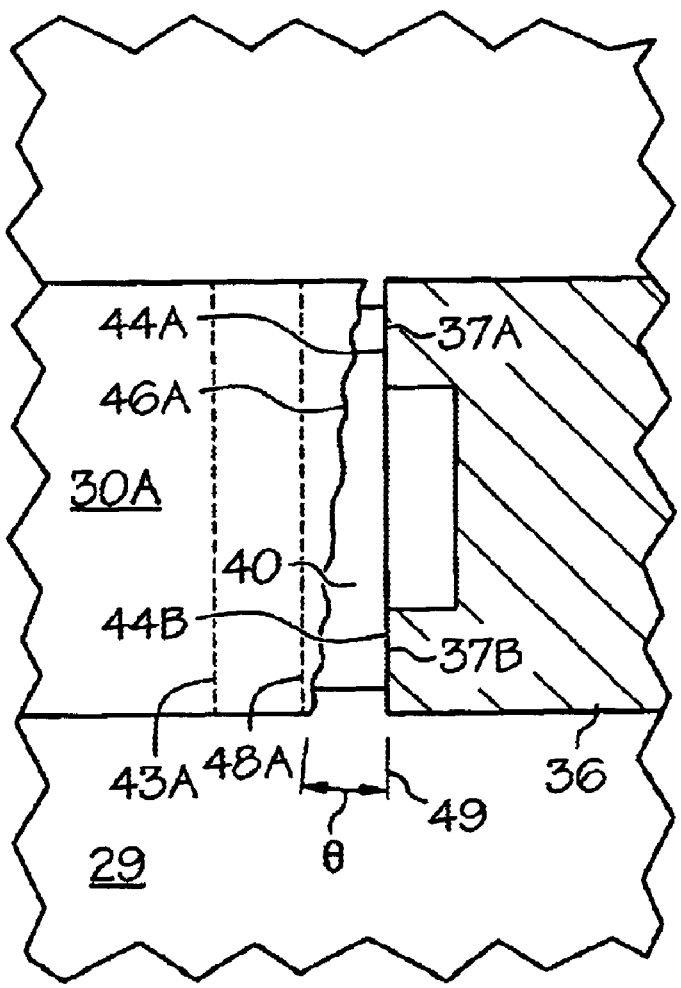
FIG. 4 is a top view of the alignment configuration of the present invention illustrating expanded tolerance in the angular orientation of the bench cleave, in accordance with the present invention.

FIG. 4 is a top view of the alignment configuration of the present invention illustrating enhanced tolerance in angular orientation of the bench cleave. The alignment rod 40 makes contact with the alignment feature 36 at first and second contact regions 37A, 37B. It is well known that two contact points provide an advantageous arrangement for aligning a line (namely the outermost edge of the rod 40) with an alignment feature. In this exaggerated view, the bench cleave 46A is directed along an angle θ with respect to a registration axis 49 defined between the first and second contact regions 37A, 37B of the alignment feature 36. While such a cleave angle θ would lead to angular misalignment of the bench in the prior art embodiment defined above, in the case of the present invention, the cleave angle has no effect on the alignment, since the registration surface 44A, 44B is derived from the outer face of the rod 40 extending from the body of the frame 30A, and since the outer side surface of the frame 30A resulting from the cleave 46A does not extend beyond the lateral region defined between outer contact point 48A, and the registration surface 44A, 44B at the outermost portion of the rod 40.

Figure 5:
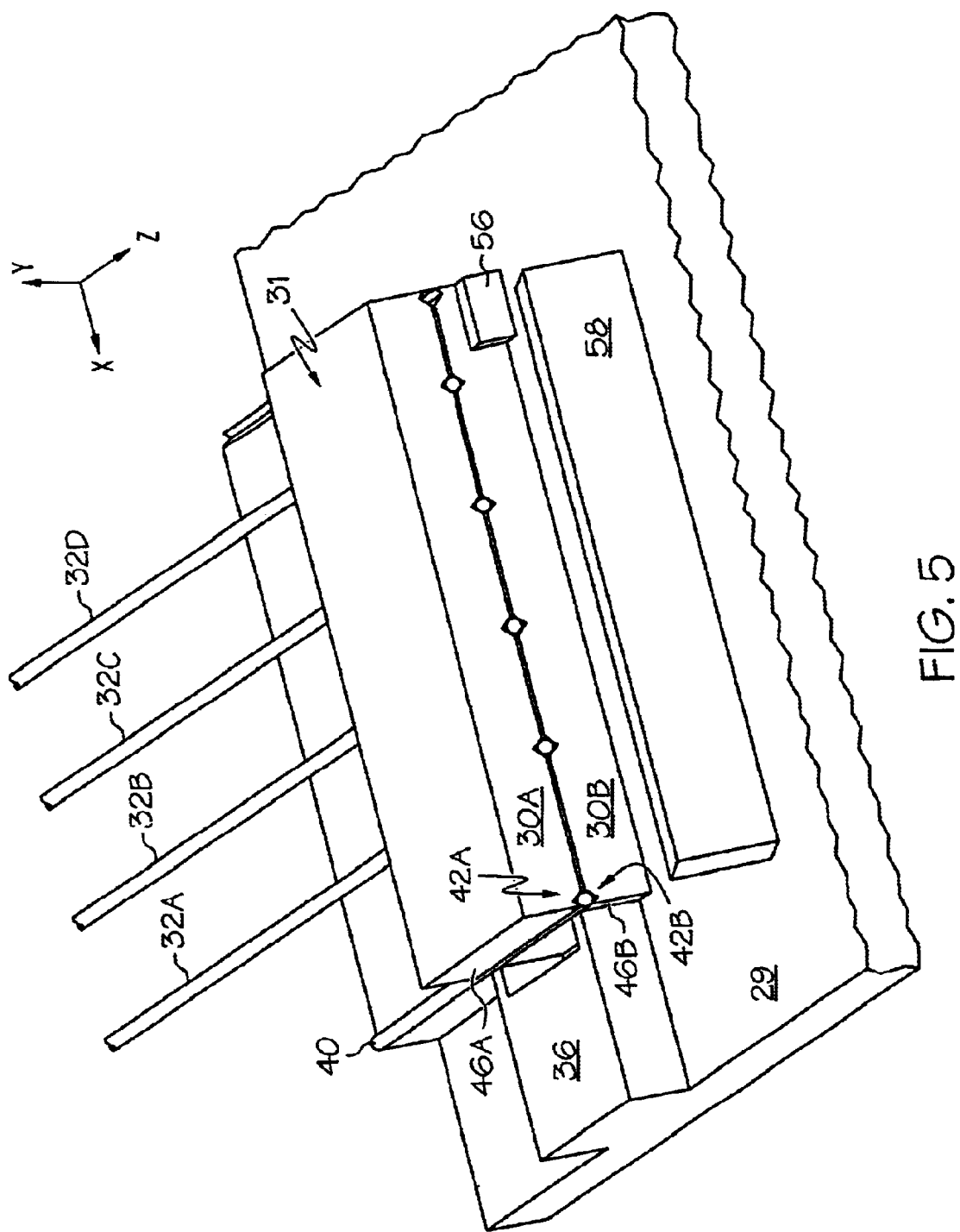
FIG. 5 is a perspective view of the alignment configuration of the present invention, illustrating alignment of a fiber bench with an element on the substrate.

FIG. 5 is a perspective view of the alignment configuration of the present invention. In this example, the fiber bench 31 is aligned in the horizontal direction, i.e. along the x-axis, via the alignment rod 40 engaging horizontal alignment feature 36. The bench 31 is further aligned longitudinally along the z-axis by the abutting longitudinal alignment feature 56. A second alignment rod could optionally be used for longitudinal alignment of the bench. Fibers 32A–32D are thus properly aligned with component 58 on the substrate 29.

In this manner, the present invention provides an apparatus and method for aligning a microbench with an alignment feature on a substrate. The relatively inaccurate cleave operation is effectively removed from the alignment procedure, since the position of the registration surface is independent of the position and angular orientation of the cleave.

While this invention has been particularly shown and described with references to preferred embodiments thereof, it will be understood by those skilled in the art that various changes in form and details may be made herein without departing from the spirit and scope of the invention as defined by the appended claims.

For example, the rod may comprise any body of known diameter, including, but not limited to, an optical fiber or a rod formed of silica, metal, graphite, or semiconductor material and may have a circular, elliptical, square or other polygon cross-section. The bench may be formed of semiconductor material such as silicon that is photolithographically processed to form the registration V-groove, or may be formed of a workable metal or composite material, in which case the registration V-groove can be molded or machined.

In the case where the bench is a fiber array bench, the registration V-groove may be of the same geometry as the fiber V-grooves, or may be formed larger or smaller than the fiber V-grooves, depending on the size of the registration rod.

While the alignment configuration of the present invention is advantageous for aligning and bonding a bench to a substrate, as explained above, it is equally applicable to other processes requiring accurate alignment of the bench to an alignment feature. For example, in the above example, where the bench comprises a fiber array, the rod can be used as a registration surface during polishing of the fiber array end surface. In this manner, passive focus alignment of the fiber array can be achieved.

Additionally, although the above example illustrates a registration surface on the rod that is parallel to the alignment feature, the registration surface can be defined at any angle with respect to the alignment feature.

Furthermore, while the example above shows upper and lower registration V-grooves, a single lower registration V-groove on the lower frame can be used in combination with an upper plate to seat the rod in the V-groove.

Still further, the reference element need not extend beyond the outer wall(s) of the bench. For example, a cantilevered extension or tongue is formed on the alignment feature 36, in some embodiments. This extension projects inward, toward the alignment feature, and past one or both of the side surfaces 46A, 46B.

I claim:

1. A bench registration system for registering a bench with an alignment feature comprising:

a fiber bench including a registration groove comprising a V-groove; and a rod in the registration groove, a portion of the rod engaging the alignment feature, wherein the rod contacts the registration groove at an inner contact point and an outer contact point, and wherein an outermost registration surface of the rod portion is laterally positioned beyond an outer wall of the fiber bench.

2. The bench registration system of claim 1 wherein the bench is cleaved or die sawed along the registration groove at a lateral position between the outer contact point and a location of the outermost registration surface.

3. The bench registration system of claim 1 wherein the bench comprises silicon.

4. The bench registration system of claim 1 wherein the bench includes an upper frame and a lower frame, and wherein the upper and lower frames each include opposed upper and lower registration grooves for housing the rod.

5. The bench registration system of claim 1 wherein a lateral axis of the bench and a longitudinal axis of the registration groove are perpendicular.

6. A method for registering a known position on a bench with an alignment feature comprising:

forming a fiber bench having a registration groove comprising a V-groove;

mounting a rod in the registration groove such that the rod contacts the V-groove at an inner contact point and an outer contact point;

installing the bench on a substrate having an alignment feature such that an outermost surface of the rod engages the alignment feature.

7. The method of claim 6 further comprising cleaving the bench in a direction of the registration groove at a lateral position between the outer contact point and the outermost registration surface.

8. The method of claim 6 further comprising forming the bench from silicon wafer material.

9. The method of claim 6 further comprising forming the bench to include an upper frame and a lower frame, and forming upper and lower registration grooves in the respective upper and lower frames for housing the rod.

10. The method of claim 6 wherein a lateral axis of the bench and the longitudinal axis of the registration groove are perpendicular.

11. A fiber bench registration system, comprising:

a substrate including an alignment feature;

a fiber bench including a registration groove comprising a V-groove; and a reference element installed in the registration groove, the reference element engaging the alignment feature, wherein the reference element contacts the registration groove at an inner contact point and an outer contact point, and wherein an outermost registration surface of the reference element engages the alignment feature.

12. The fiber bench of claim 11 wherein the reference element comprises a rod.

* * * * *